US012611970B2

(12) United States Patent
Toutant et al.

(10) Patent No.: US 12,611,970 B2
(45) Date of Patent: Apr. 28, 2026

(54) REMOTE HANDLE ASSEMBLY

(71) Applicant: Magna Seating Inc., Aurora (CA)

(72) Inventors: Evan Toutant, Oxford, MI (US);
Creston A. Zang, Northville, MI (US)

(73) Assignee: Magna Seating Inc., Aurora (CA)

( * ) Notice: Subject to any disclaimer, the term of this patent is extended or adjusted under 35 U.S.C. 154(b) by 174 days.

(21) Appl. No.: 18/574,258

(22) PCT Filed: Jun. 24, 2022

(86) PCT No.: PCT/US2022/034913
§ 371 (c)(1),
(2) Date: Dec. 26, 2023

(87) PCT Pub. No.: WO2022/272069
PCT Pub. Date: Dec. 29, 2022

(65) Prior Publication Data
US 2024/0317118 A1     Sep. 26, 2024

Related U.S. Application Data

(60) Provisional application No. 63/215,034, filed on Jun. 25, 2021.

(51) Int. Cl.
B60N 2/22          (2006.01)
(52) U.S. Cl.
CPC ........... B60N 2/22 (2013.01); B60Y 2400/411 (2013.01)
(58) Field of Classification Search
CPC ............................ B60N 2/22; B60Y 2400/411
See application file for complete search history.

(56) References Cited

U.S. PATENT DOCUMENTS

| | | | |
|---|---|---|---|
| 4,629,251 A | 12/1986 | Tezuka | |
| 7,802,490 B2 | 9/2010 | Ingraham | |
| 7,959,229 B2 * | 6/2011 | Ishijima | B60N 2/165 |
| | | | 297/358 |
| 8,474,911 B2 * | 7/2013 | Parker | B60N 2/12 |
| | | | 297/341 |
| 9,216,667 B1 * | 12/2015 | Izawa | B60N 2/6009 |

(Continued)

FOREIGN PATENT DOCUMENTS

| | | |
|---|---|---|
| CN | 110217141 | 9/2019 |
| KR | 20200132418 | 11/2020 |

(Continued)

*Primary Examiner* — Philip F Gabler
(74) *Attorney, Agent, or Firm* — Miller, Canfield, Paddock and Stone

(57)          ABSTRACT

A remote handle assembly for selectively unlocking a component in a seat assembly for an automotive vehicle comprises a handle bracket having a hole extending laterally through the handle bracket, a pulley having a pivot hole extending axially through the pulley, a handle spline having a passageway extending axially through the handle spline, and a pin extending through the passageway in the handle spline, the pivot hole in the pulley, and the hole in the handle bracket. The pulley is pivotably coupled to the pin between an unactuated position and an actuated position and the handle spline is pivotably coupled to the pin between an unactuated position and an actuated position and the pin is fixedly coupled to the handle bracket and is configured to retain the handle bracket, the pulley, and the handle spline together.

18 Claims, 14 Drawing Sheets

(56)                    References Cited

U.S. PATENT DOCUMENTS

|  |  |  |  |  |
|---|---|---|---|---|
| 9,975,455 | B2 * | 5/2018 | Susko | B60N 2/20 |
| 10,385,955 | B2 | 8/2019 | Dankbaar | |
| 10,675,997 | B2 * | 6/2020 | Tomandl | B60N 2/2356 |
| 12,319,187 | B2 * | 6/2025 | Kapusky | F16C 1/106 |
| 2020/0282876 | A1 | 9/2020 | Tomandl | |
| 2023/0150401 | A1 * | 5/2023 | Zang | B60N 2/2227 |
| | | | | 297/463.1 |

FOREIGN PATENT DOCUMENTS

| | | |
|---|---|---|
| KR | 102207896 | 1/2021 |
| WO | 2013018869 | 2/2013 |

* cited by examiner

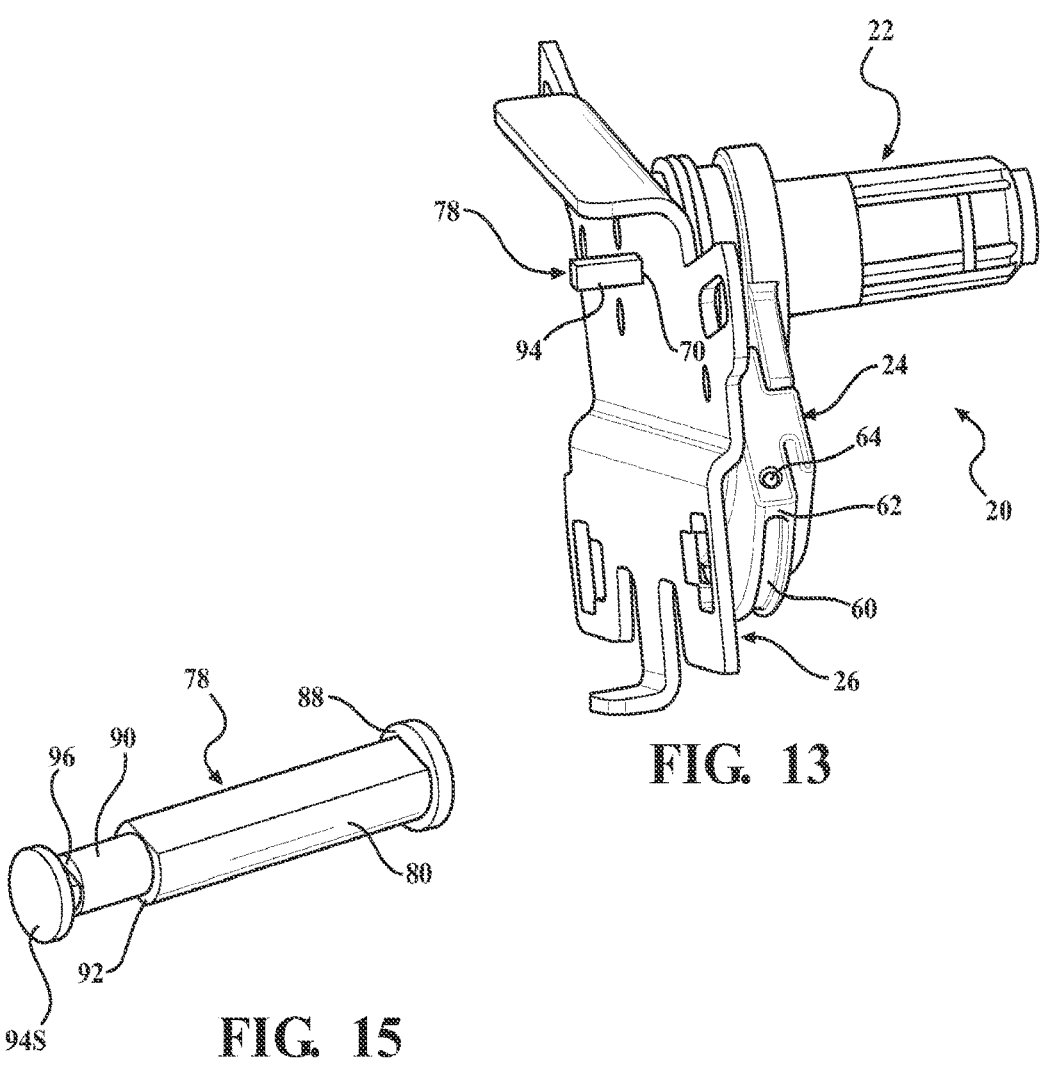
FIG. 13
FIG. 15
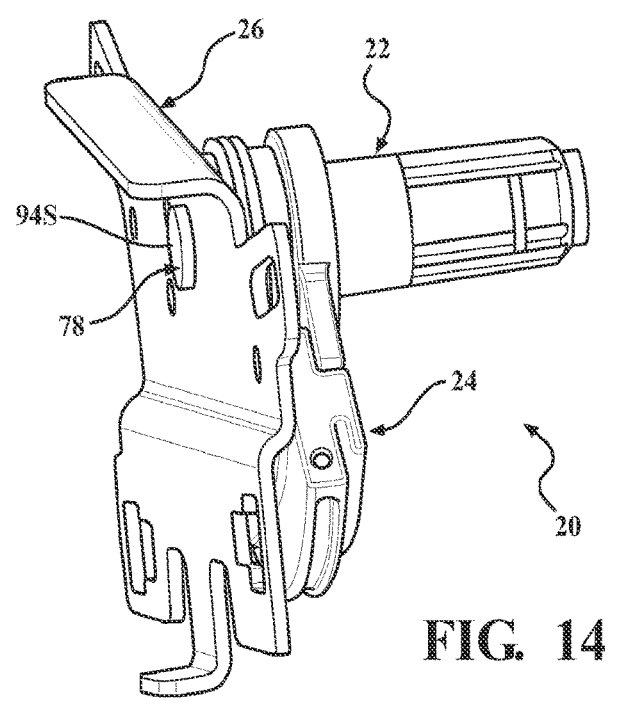
FIG. 14

REMOTE HANDLE ASSEMBLY

CROSS-REFERENCE TO RELATED APPLICATIONS

This application claims priority to U.S. Provisional Application No. 63/215,034, filed on Jun. 25, 2021, the disclosure of which is hereby incorporated by reference in its entirety.

BACKGROUND OF THE INVENTION

1. Field of the Invention

The present invention relates to a seat assembly for use in an automotive vehicle. More particularly, the invention relates to a remote handle assembly configured to unlock a recliner assembly in a seat assembly.

2. Description of Related Art

Automotive vehicles typically include one or more seat assemblies having a seat cushion and a seat back for supporting a passenger above a vehicle floor. The seat assemblies often include a recliner assembly pivotally coupling the seat back to the seat cushion. It is commonly known for the recliner assembly to prevent rotation of the seat back relative to the seat cushion when the recliner assembly is locked.

Further, the seat assemblies often include a remote handle assembly attached to the seat assembly and configured to selectively unlock the recliner assembly. It is commonly known for the remote handle assembly to include a handle rotatable by an occupant and configured to actuate the remote handle assembly to unlock the recliner assembly and allow the occupant to adjust the seat back position. In addition, it is commonly known for the remote handle assembly to be optionally actuated by a power actuator, such as when the seat assembly includes a fold flat feature.

However, in certain known remote handle assemblies, the handle attached to the remote handle assembly exhibits excessive lateral play that may be perceived as an indication of poor quality by the occupant. In addition, certain known remote handle assemblies include a box with a cover supporting and containing internal components of the remote handle assembly. The box, cover, and associated fasteners add cost and manufacturing process complexity to the remote handle assembly.

It is desirable, therefore, to provide a remote handle assembly having reduced perceived lateral looseness when the handle is rotated by an occupant. It is also desirable to provide a remote handle assembly having less components so that the cost is reduced, and the manufacturing process is less complex.

SUMMARY OF THE INVENTION

According to one embodiment, there is provided a remote handle assembly for selectively unlocking a component in a seat assembly for an automotive vehicle. The remote handle assembly comprises a handle bracket having a hole extending laterally through the handle bracket, a pulley having a pivot hole extending axially through the pulley, a handle spline having a passageway extending axially through the handle spline, and a pin extending through the passageway in the handle spline, the pivot hole in the pulley, and the hole in the handle bracket, wherein the pulley is pivotally coupled to the pin between an unactuated position and an actuated position and the handle spline is pivotally coupled to the pin between an unactuated position and an actuated position and the pin is fixedly coupled to the handle bracket and is configured to retain the handle bracket, the pulley and the handle spline together.

According to another embodiment, there is provided a seat assembly for an automotive vehicle. The seat assembly comprises a seat cushion, a seat back pivotally coupled to the seat cushion, a recliner assembly configured to prevent rotation of the seat back relative to the seat cushion, and a remote handle assembly for selectively unlocking the recliner assembly. The remote handle assembly comprises a handle bracket having a hole extending laterally through the handle bracket, wherein the handle bracket is adapted to be mounted on the seat cushion, a pulley having a pivot hole extending axially through the pulley, a handle spline having a passageway extending axially through the handle spline, and a pin extending through the passageway in the handle spline, the pivot hole in the pulley, and the hole in the handle bracket, wherein the pulley is pivotally coupled to the pin between an unactuated position and an actuated position and the handle spline is pivotally coupled to the pin between an unactuated position and an actuated position and the pin is fixedly coupled to the handle bracket and is configured to retain the handle bracket, the pulley and the handle spline together.

BRIEF DESCRIPTION OF THE DRAWINGS

Advantages of the present invention will be readily appreciated as the same becomes better understood by reference to the following detailed description when considered in connection with the accompanying drawings wherein:

FIG. 13 is a perspective view of a portion of the remote handle assembly of FIG. 4, showing the pin protruding from a handle bracket;

FIG. 14 is a perspective view of the portion of the remote handle assembly of FIG. 13 after the pin is riveted to the handle bracket;

FIG. 15 is a perspective view of the pin of FIG. 7 after the pin is riveted;

DETAILED DESCRIPTION OF THE EMBODIMENTS

FIGS. 1-21 illustrate components of a seat assembly 10 for use in an automotive vehicle according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
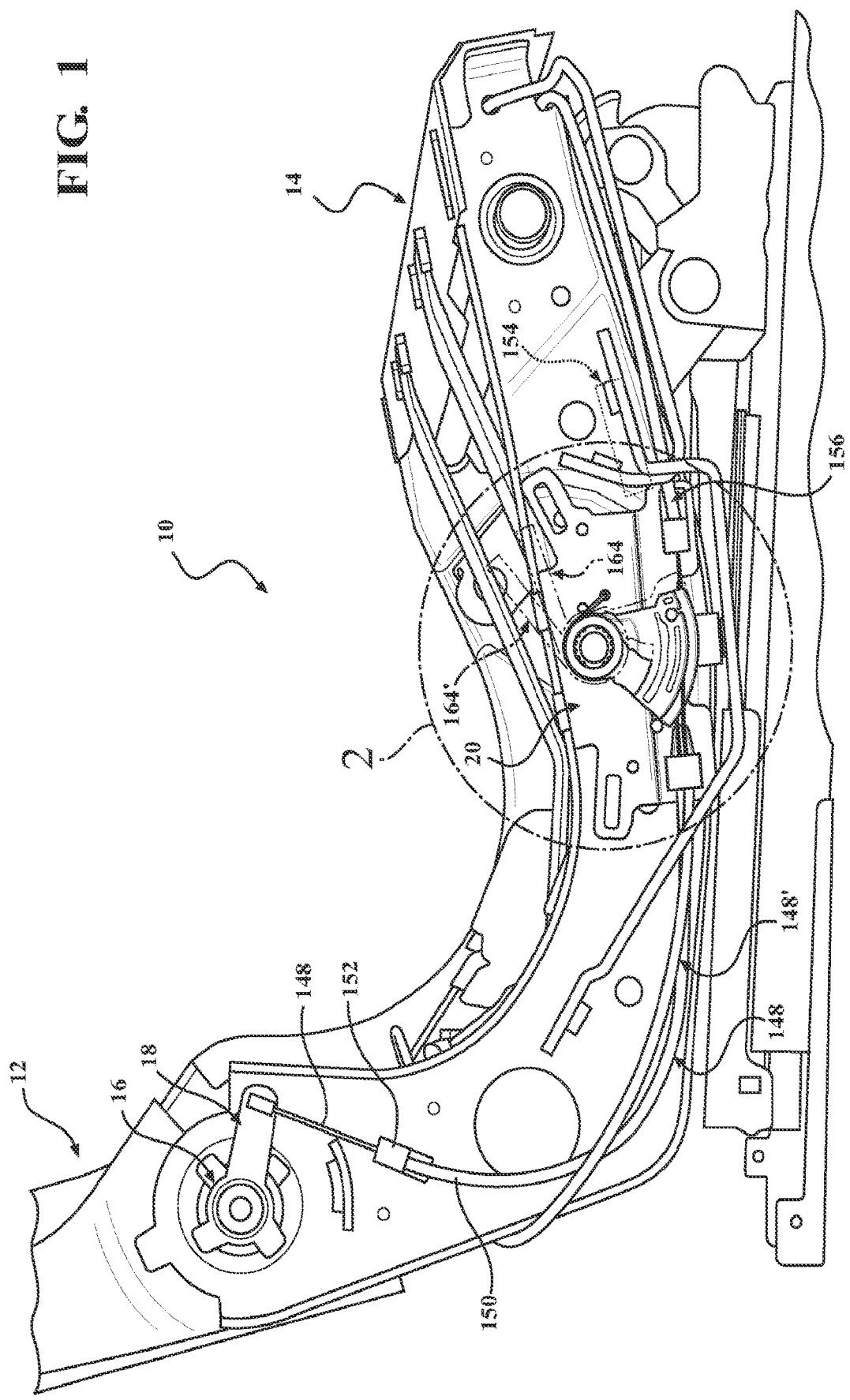
FIG. 1 is a side view of an automotive seat assembly having a remote handle assembly, according to one embodiment of the present invention.

As depicted in FIG. 1, the seat assembly 10 includes a seat back 12 pivotably coupled to a seat cushion 14 by inboard and outboard recliner assemblies 16. The recliner assemblies 16 are configured to prevent rotation of the seat back 12 relative to the seat cushion 14 while the recliner assemblies 16 are locked. The recliner assemblies 16 are selectively unlocked by actuating release levers 18 operatively coupled to the respective recliner assemblies 16.

The seat assembly 10 includes a remote handle assembly 20 configured to actuate the release levers 18 to remotely unlock the recliner assemblies 16. A first embodiment of the remote handle assembly 20 is shown in FIGS. 2-16. The remote handle assembly 20 includes a handle spline 22, a pulley 24 and a handle bracket 26. The pulley 24 is pivotably coupled with both the handle spline 22 and the handle bracket 26.

Figure 3:
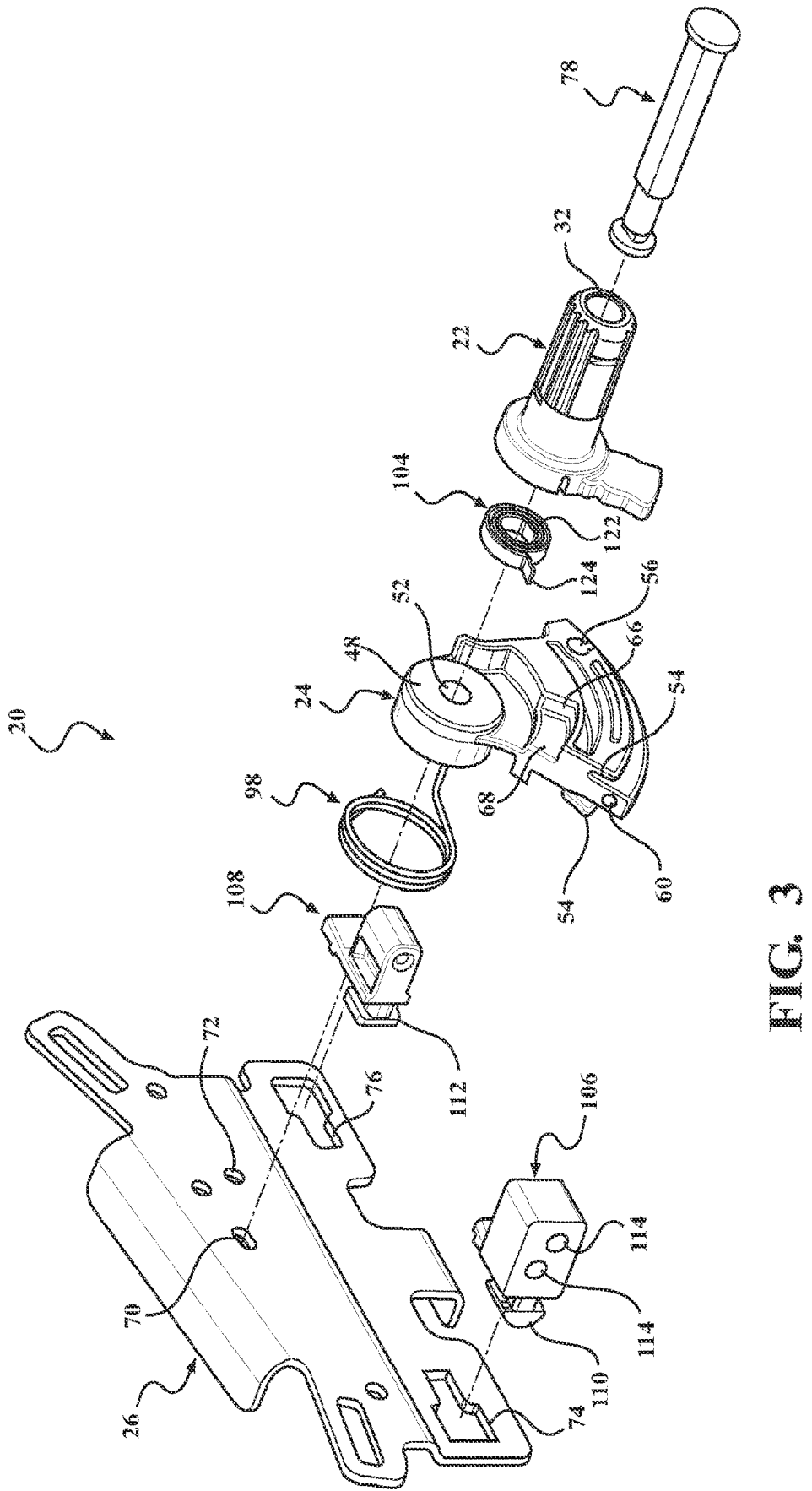
FIG. 3 is an exploded view of the remote handle assembly of FIG. 2.
Figure 4:
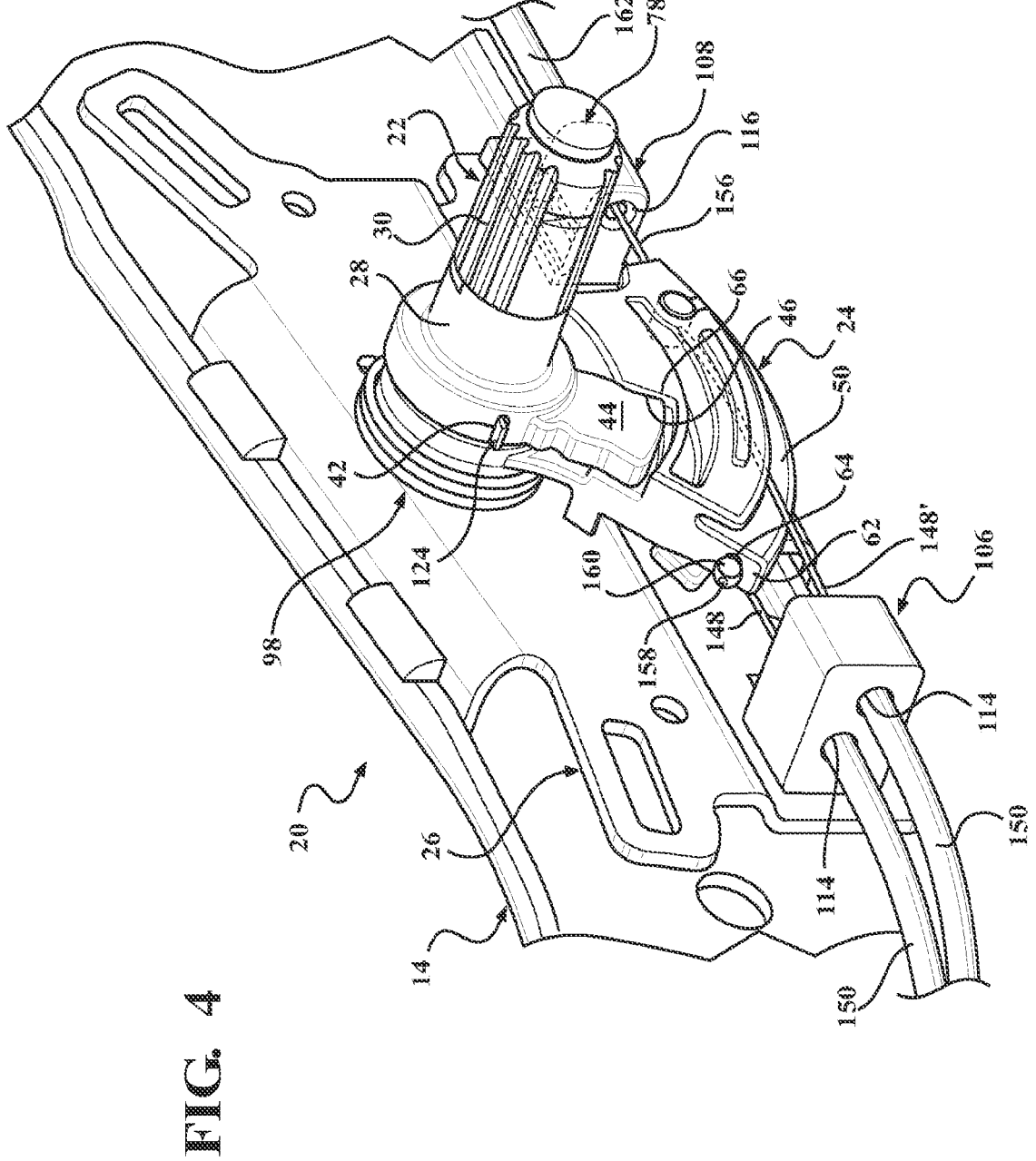
FIG. 4 is a perspective view of the remote handle assembly of FIG. 2.
Figure 5:
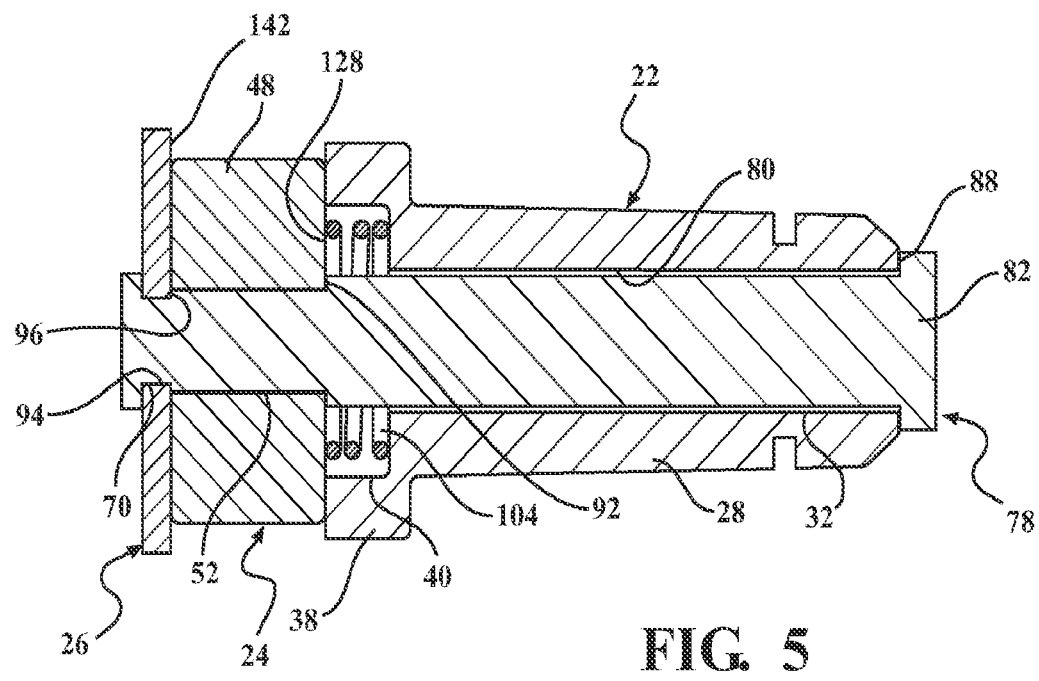
FIG. 5 is a cross-sectional view of the remote handle assembly of FIG. 4.
Figure 6:
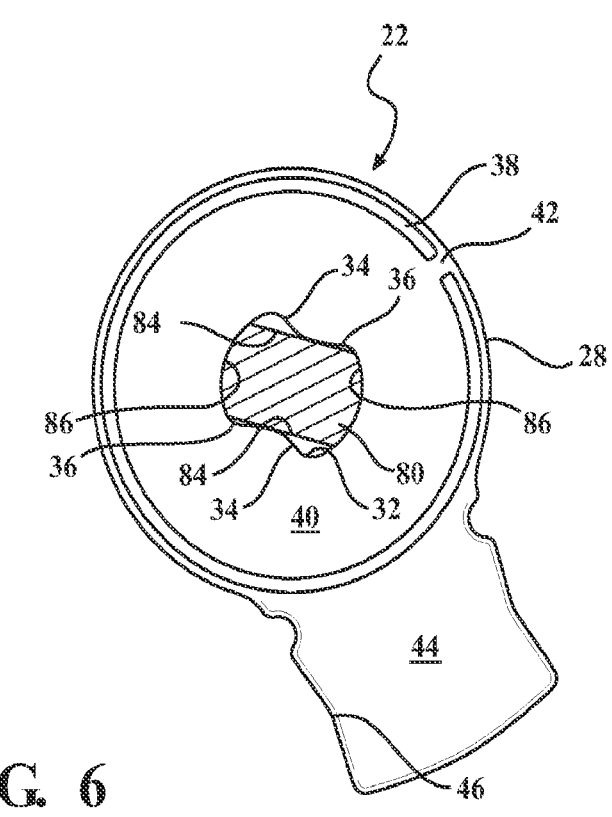
FIG. 6 is a cross-sectional view of a portion of the remote handle assembly of FIG. 4.

Referring to FIGS. 2-6, the handle spline 22 includes a generally cylindrical section 28 having an external spline 30 and a passageway 32 extending longitudinally through the cylindrical section 28. As depicted in FIG. 6, the passageway 32 is butterfly-shaped in cross-section having opposing side portions 34, 36. As shown in FIGS. 5 and 6, a rim 38 extends circumferentially around a proximal end of the cylindrical section 28 of the handle spline 22, forming a cavity 40. As depicted in FIG. 6, a spring slot 42 extends radially through the rim 38, and an actuator tab 44 projects radially from the rim 38. The actuator tab 44 includes a cam surface 46, the purpose of which is further described below. In one embodiment, the handle spline 22 is formed out of a zinc alloy such as Zinc Alloy 5 (ASTM AC41A), as a non-limiting example.

Figure 2:
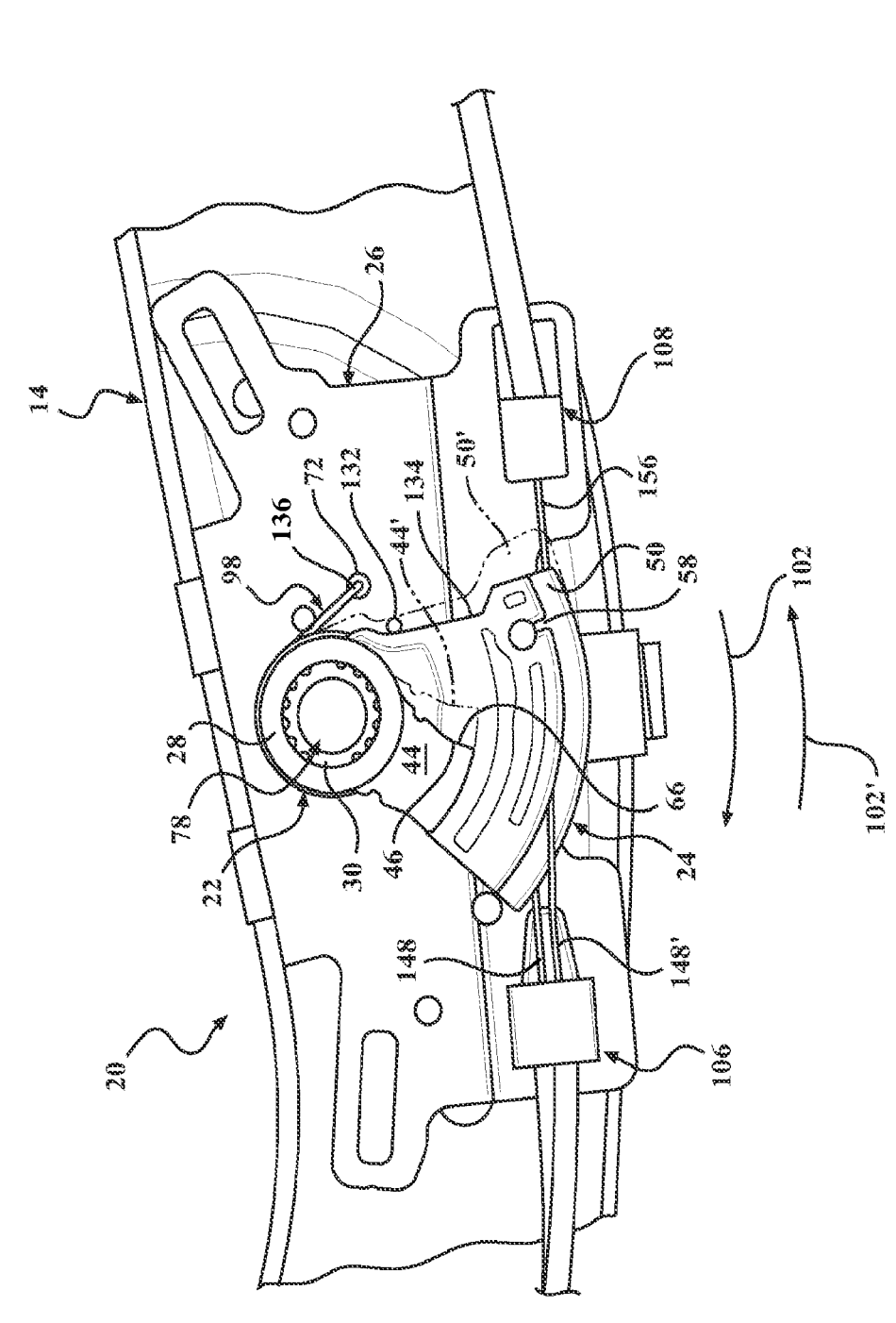
FIG. 2 is a side view of the remote handle assembly of FIG. 1.

Referring to FIGS. 2 through 5, the pulley 24 includes a hub 48 and a sector 50 projecting radially from the hub 48. A pivot hole 52 extends axially through the hub 48 and defines an axis of rotation of the pulley 24. Opposing primary cable channels 54 extend circumferentially along an outer portion of the sector 50 and terminate in a retention hole 56 passing axially through the sector 50. A passageway 58 extends between each cable channel 54 and each retention hole 56. As best shown in FIG. 13, a secondary cable channel 60 extends circumferentially along the outer portion of the sector 50 and terminates at an end wall 62 having a cable hole 64 extending circumferentially therethrough. As depicted in FIG. 3, the pulley 24 includes a ledge 66 projecting from a distal surface 68 of the pulley 24. The ledge 66 is configured to frictionally engage with the cam surface 46 on the actuator tab 44, as shown in FIG. 4. In one embodiment, the pulley 24 is formed out of a plastic such as nylon 6/6, as a non-limiting example.

Referring to FIG. 3, the handle bracket 26 includes a keyed hole 70, a spring hole 72, and opposing attachment slots 74, 76 extending laterally through the handle bracket 26. In the embodiment shown in FIG. 3, the keyed hole 70 has a double d-shape. The handle bracket 26 is formed from steel as a non-limiting example.

Figure 7:
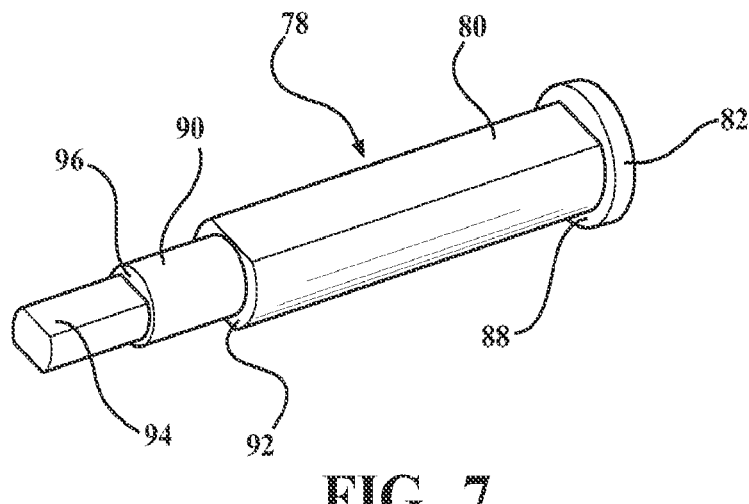
FIG. 7 is a perspective view of a pin, according to one embodiment of the present invention.
Figure 8:
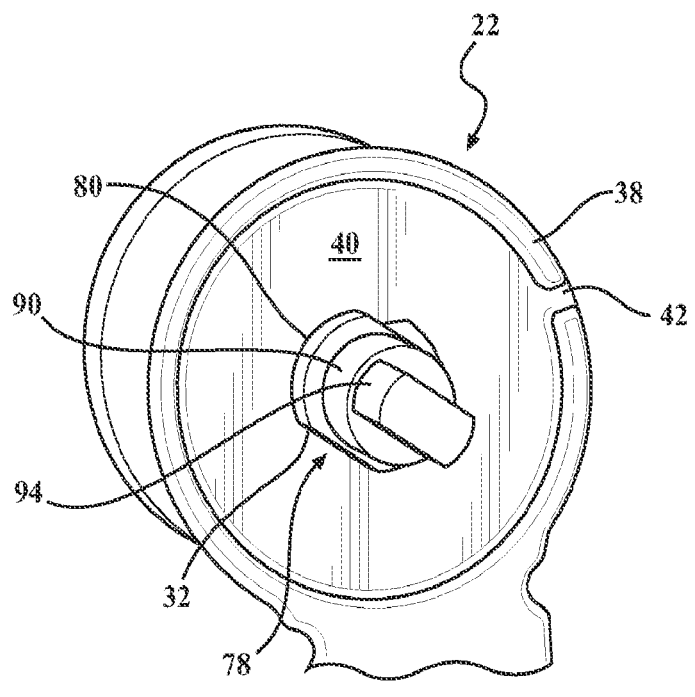
FIG. 8 is a perspective view of a portion of the remote handle assembly of FIG. 4.

Referring to FIGS. 5 and 7, the remote handle assembly 20 also includes a pin 78 configured to retain the components of the remote handle assembly 20 together. The pin 78 includes a central section 80 extending from a head 82. As shown in FIG. 6, the central section 80 has a double d-shape in cross-section with generally parallel side walls 84 extending between curved end walls 86. The central section 80 is sized and shaped such that it will pass through and be pivotably coupled to the passageway 32 in the handle spline 22 while the head 82 is sized and shaped such that it will not pass through the passageway 32 in the handle spline 22. Shown in FIG. 7, a ledge 88 on the proximal end of the head 82 extends radially from the central section 80.

Shown in FIG. 7, a generally cylindrical section 90 projects axially away from the central section 80 of the pin 78. The cylindrical section 90 is sized and shaped such that it will pass through and be pivotably coupled to the pivot hole 52 in the hub 48 of the pulley 24. A stop ledge 92 on the proximal end of the central section 80 extends radially from the cylindrical section 90. Projecting axially from the cylindrical section 90 and forming a proximal end of the pin 78 is an end section 94. A base ledge 96 on the proximal end of the cylindrical section 90 projects radially from the end section 94.

Figure 9:
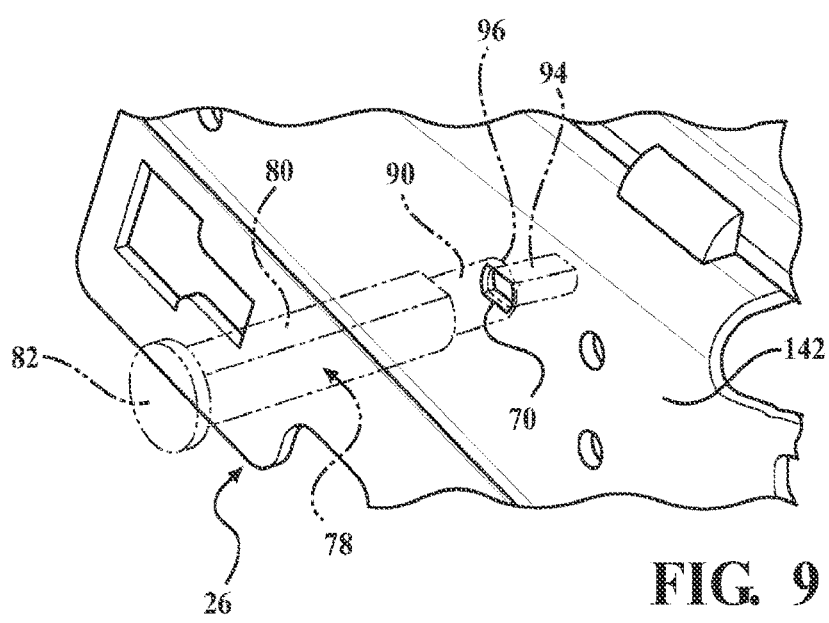
FIG. 9 is a perspective view of a portion of the remote handle assembly of FIG. 4.

As shown in FIG. 9, the end section 94 of the pin 78 and the keyed hole 70 in the handle bracket 26 are sized and shaped such that the end section 94 will pass through the keyed hole 70 in the handle bracket 26, but will not rotate within the keyed hole 70. In an exemplary embodiment shown in FIG. 9, the end section 94 of the pin 78 and the keyed hole 70 in the handle bracket 26 have a double d-shape, as a non-limiting example. The pin 78 is formed out of a carbon steel, such as SAE J403 grade 1018, as a non-limiting example.

Figure 12:
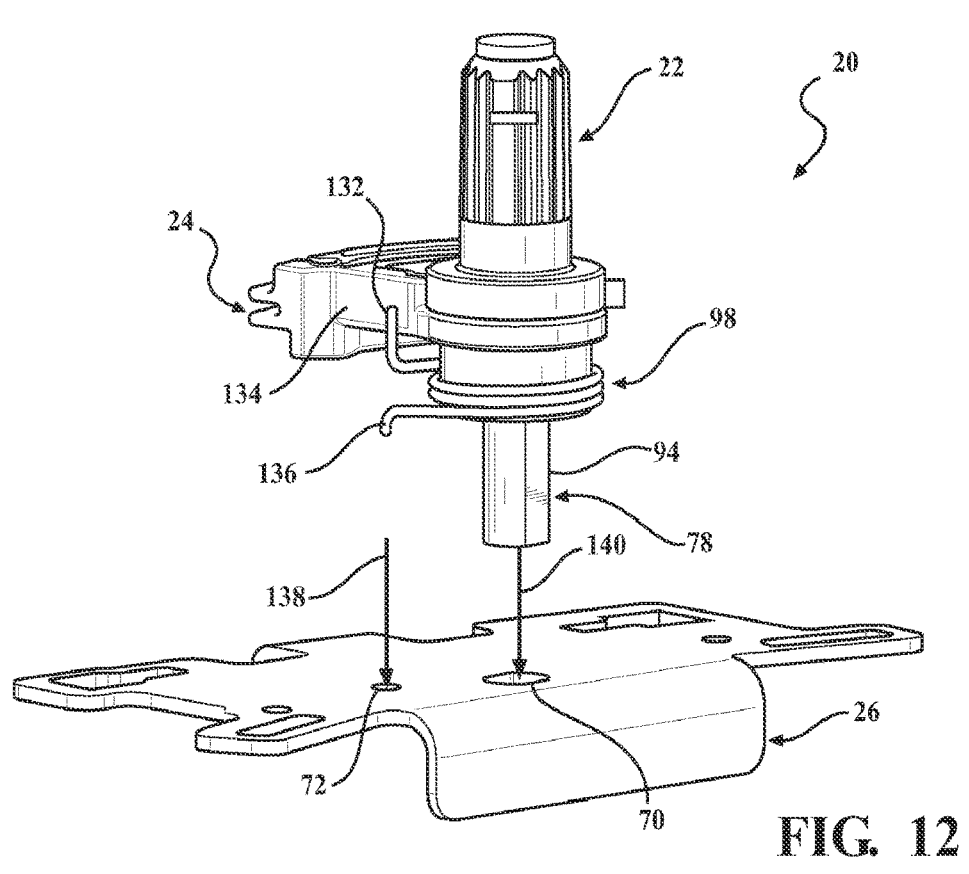
FIG. 12 is a partially exploded view of a portion of the remote handle assembly of FIG. 4.
Figure 16:
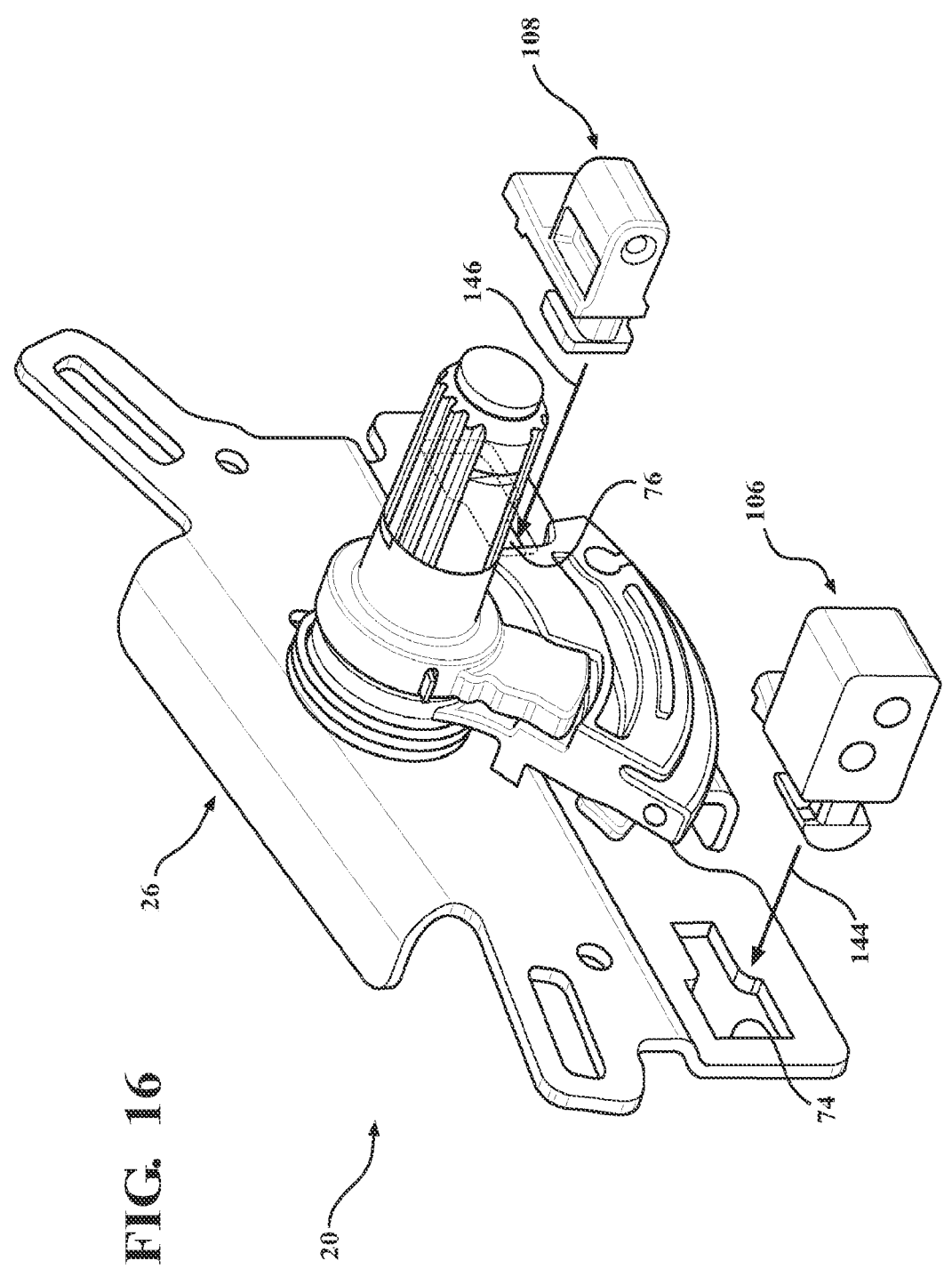
FIG. 16 is a partially exploded view of the remote handle assembly of FIG. 4.

As best shown in FIG. 12, the remote handle assembly 20 also includes a pulley spring 98, such as a torsion spring, a coiled spring, or the like. The pulley spring 98 is operatively coupled between the pulley 24 and the handle bracket 26, and applies a bias force to the pulley 24 urging the pulley 24 to rotate in the clockwise direction (arrow 102) as viewed in FIG. 2. The pulley spring 98 is formed out of music wire such as ASTM A228, as a non-limiting example.

Figure 10:
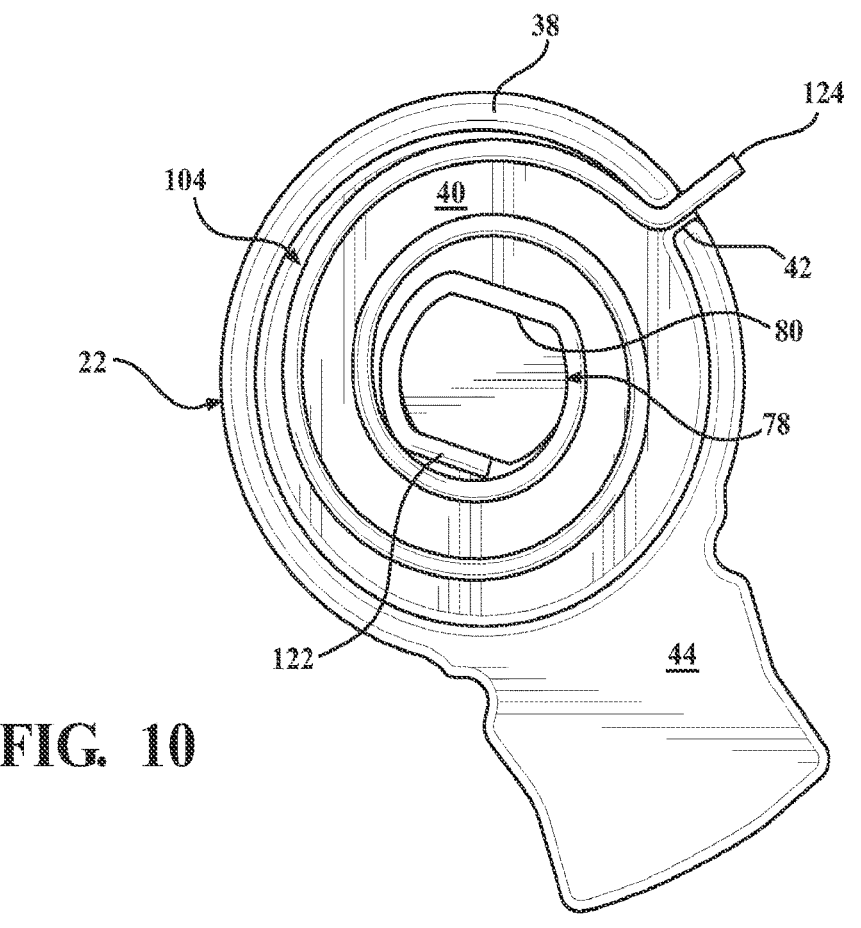
FIG. 10 is a side view of a portion of the remote handle assembly of FIG. 4.

Referring to FIGS. 3 and 10, the remote handle assembly 20 also includes a spline spring 104, such as a coil spring, a torsion spring, or the like. In one embodiment, the spline spring 104 is formed out of music wire such as ASTM A228, as a non-limiting example. The spline spring 104 is operatively coupled between the handle spline 22 and the pin 78 with the spline spring 104 applying a bias force to the handle spine 22 urging the handle spline 22 to rotate in the clockwise direction (arrow 102) as viewed in FIG. 2. It will be appreciated that the spring geometry of the spline spring 104 and the pulley spring 98 may be adjusted to meet torque requirements of different seat assemblies 10.

As depicted in FIGS. 3 and 4, the remote handle assembly 20 also includes a manual cable attachment 106 and a power cable attachment 108. The manual and power cable attachments 106, 108 have respective base portions 110, 112 configured to fixedly couple the cable attachments 106, 108 to the respective attachment slot 74, 76 in the handle bracket 26. The manual cable attachment 106 includes a pair of holes 114, and the power cable attachment 108 includes a cable hole 116. In one exemplary embodiment, the manual and power cable attachments 106, 108 are formed out of a plastic such as nylon 6/6, as a non-limiting example.

Figure 11:
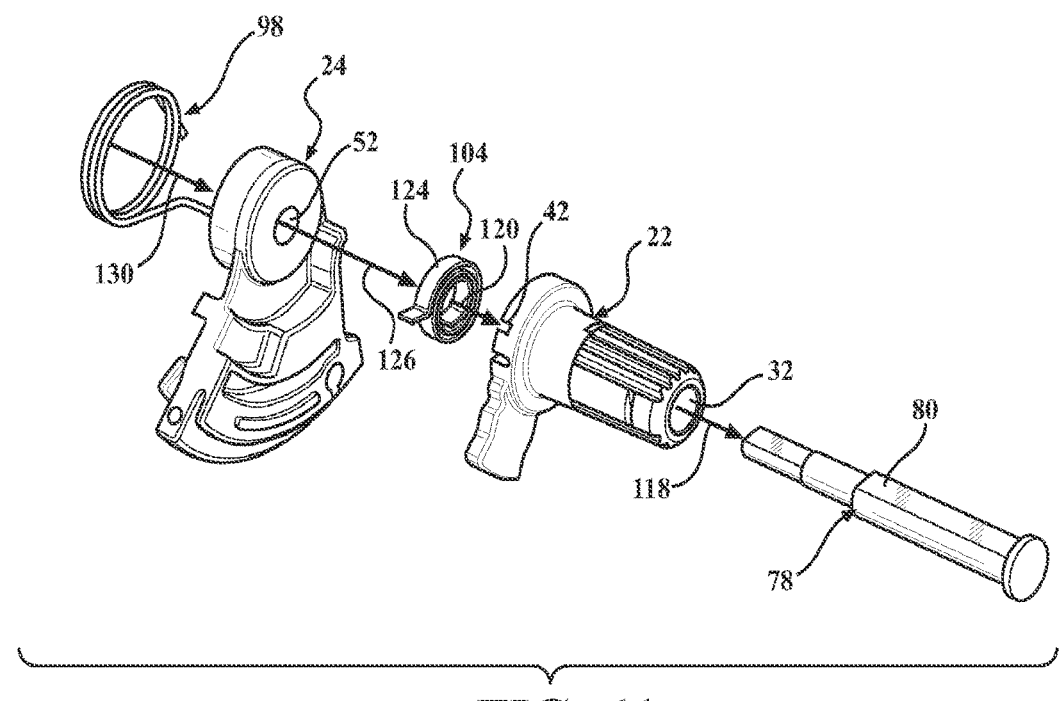
FIG. 11 is an exploded view of a portion of the remote handle assembly of FIG. 4.

FIGS. 11-16 illustrate an assembly method of the remote handle assembly 20 according to one embodiment of the present invention. Referring to FIG. 11, the handle spline 22 is slid onto the pin 78 (arrow 118) until the distal end of the handle spline 22 abuts the ledge 88 on the head 82 of the pin 78. Next, the spline spring 104 is inserted into the cavity 40 (arrow 120) in the handle spline 22 with the inner end 122 of the spline spring 104 wrapped around the central section 80 of the pin 78 and the outer end 124 of the spline spring 104 passing through the spring slot 42 in the handle spline 22 as reflected in FIG. 10. Referring back to FIG. 11, next, the pulley 24 is slid onto the pin 78 through the pivot hole 52 (arrow 126) until the stop ledge 92 on the pin 78 abuts a distal surface 128 of the hub 48 of the pulley 24, as shown in FIG. 5. At this point, the rim 38 of the handle spline 22 abuts the distal surface 128 of the hub 48 of the pulley 24.

Next, the pulley spring 98 is assembled onto the pulley 24 (arrow 130). As shown in FIG. 12, a second end 132 of the pulley spring 98 is frictionally engaged with a side portion 134 of the pulley 24, and a first end 136 of the pulley spring 98 is inserted through the spring hole 72 in the handle bracket 26 (arrow 138). The end section 94 of the pin 78 is then aligned with and inserted into the keyed hole 70 in the handle bracket 26, as shown by arrow 140 so that the base ledge 96 on the pin 78 frictionally engages with a distal surface 142 of the handle bracket 26, as depicted in FIG. 5.

FIG. 13 shows the end section 94 of the pin 78 protruding from the rear side of the handle bracket 26. Next, the end section 94 of the pin 78 is riveted flush to the handle bracket 26, shown as element 94S in FIG. 14. Alternatively, the end section 94 may be staked against the handle bracket 26. The pin 78 is shown in FIG. 15 after the riveting process and removed from the remote handle assembly 20. Referring to FIGS. 5 and 15, the lateral looseness of the handle spline 22 is controlled by the riveting or staking process in combination with the ledges 88, 92, 96 on the pin 78 that define internal hard stops. Depicted in FIG. 16, after the pin 78 is riveted or staked against the handle bracket 26, the base portions 110, 112 of the manual and power cable attachments 106, 108 are fixedly coupled to the respective attachment slot 74, 76 in the handle bracket 26 (arrow 144, 146).

Referring to FIG. 1, primary Bowden cables 148, 148' operatively couple the remote handle assembly 20 to the respective release levers 18. The proximal ends of the primary Bowden cables 148, 148' are inserted through the respective cable holes 114 in the manual cable attachment 106 and extend through the respective cable channels 54 and the passageways 58 in the pulley 24 and terminate in the retention holes 56. Each primary Bowden cable 148, 148' passes longitudinally through a conduit 150 having a distal end fixedly coupled to the seat assembly 10 by a fitting attachment 152 and a proximal end fixedly coupled to the manual cable attachment 106, as best illustrated in FIG. 4.

The seat assembly 10 also includes a power actuator 154 operatively coupled to the remote handle assembly 20 via a secondary Bowden cable 156. The power actuator 154 applies tension to the secondary Bowden cable 156 while the power actuator 154 is actuated. The tension is removed from the secondary Bowden cable 156 when the power actuator 154 is deactivated.

A proximal end 158 of the secondary Bowden cable 156 is inserted through the cable hole 116 in the power cable attachment 108 through the secondary cable channel 60 and the cable hole 64 in the pulley 24, and terminates with an end fitting 160. The secondary Bowden cable 156 passes longitudinally through a secondary conduit 162, which is fixedly coupled to the power cable attachment 108.

The seat assembly 10 also includes a recliner handle 164 positioned for easy access by the occupant and operatively coupled to the remote handle assembly 20, as illustrated in FIG. 1. The recliner handle 164 is rotatable between an unactuated position (shown as recliner handle 164) and an actuated position (shown as recliner handle 164'). The recliner handle 164 is spring-biased towards the unactuated position.

The recliner handle 164 has an internal spline configured to matingly engage with the external spline 30 on the handle spline 22. As depicted in FIG. 6, the opposing side portions 34, 36 in the passageway 32 in the handle spline 22 define the unactuated position and the actuated position, respectively, of both the handle spline 22 and the recliner handle 164. The side portions 34, 36 of the passageway 32 may be adjusted for the travel range required for a specific recliner handle 164.

To unlock the recliner assemblies 16, the occupant rotates the recliner handle 164 about the pin 78 from the unactuated position to the actuated position, shown as element 164' in FIG. 1. Rotating the recliner handle 164 to the actuated position 164' causes the actuator tab 44 of the handle spline 22 to rotate about the pin 78 in the counterclockwise direction (arrow 102') as viewed in FIG. 2 to a tab actuated position (shown as actuator tab 44'). The engagement between the cam surface 46 of the actuator tab 44 and the ledge 66 on the pulley 24 causes the pulley 24 to rotate about the pin 78 in the counterclockwise direction (arrow 102') to the sector actuated position (shown as sector 50' in FIG. 2). The rotation of the sector 50 to the sector actuated position 50' applies tension to the primary Bowden cables 148, 148', which actuates the release levers 18 to unlock the recliner assemblies 16. The occupant may pivot the seat back 12 relative to the seat cushion 14 while the occupant retains the recliner handle 164 in the actuated position 164' and the recliner assemblies 16 are unlocked.

After the occupant releases the recliner handle 164, the spline spring 104 rotates the actuator tab 44 of the handle spline 22 about the pin 78 in the clockwise direction (arrow 102) as viewed in FIG. 2 from the tab actuated position 44' to the tab unactuated position 44, which returns the recliner handle 164 to the unactuated position. In addition, the pulley spring 98 rotates the sector 50 in the clockwise direction (arrow 102) about the pin 78 from the sector actuated position 50' to the sector unactuated position 50 since the load applied by the actuator tab 44 onto the pulley 24 has been removed. When the sector 50 is returned to the sector unactuated position 50, tension is removed from the primary Bowden cables 148, 148', which removes the tension applied the to to the release levers 18 causing the recliner assemblies 16 to automatically relock.

Referring to FIGS. 1 and 2, when the occupant initiates a fold flat function, the power actuator 154 applies tension to the secondary Bowden cable 156 causing the sector 50 to rotate about the pin 78 in the counterclockwise direction (arrow 102') to the sector actuated position 50'. The rotation of the sector 50 to the sector actuated position 50' applies tension to the primary Bowden cables 148, 148' thereby actuating the release levers 18 and causing the recliner assemblies 16 to unlock, at which point the seat back 12 may be rotated so that the seat back 12 overlays the seat cushion 14. During the fold flat function, the recliner handle 164 is decoupled from the power actuator 154 so that the recliner handle 164 remains stationary while the power actuator 154 rotates the sector 50. To relock the recliner assemblies 16, the power actuator 154 removes tension from the secondary Bowden cable 156, which allows the pulley spring 98 to rotate the sector 50 about the pin 78 in the clockwise direction (arrow 102) towards the sector unactuated position 50.

Figure 17:
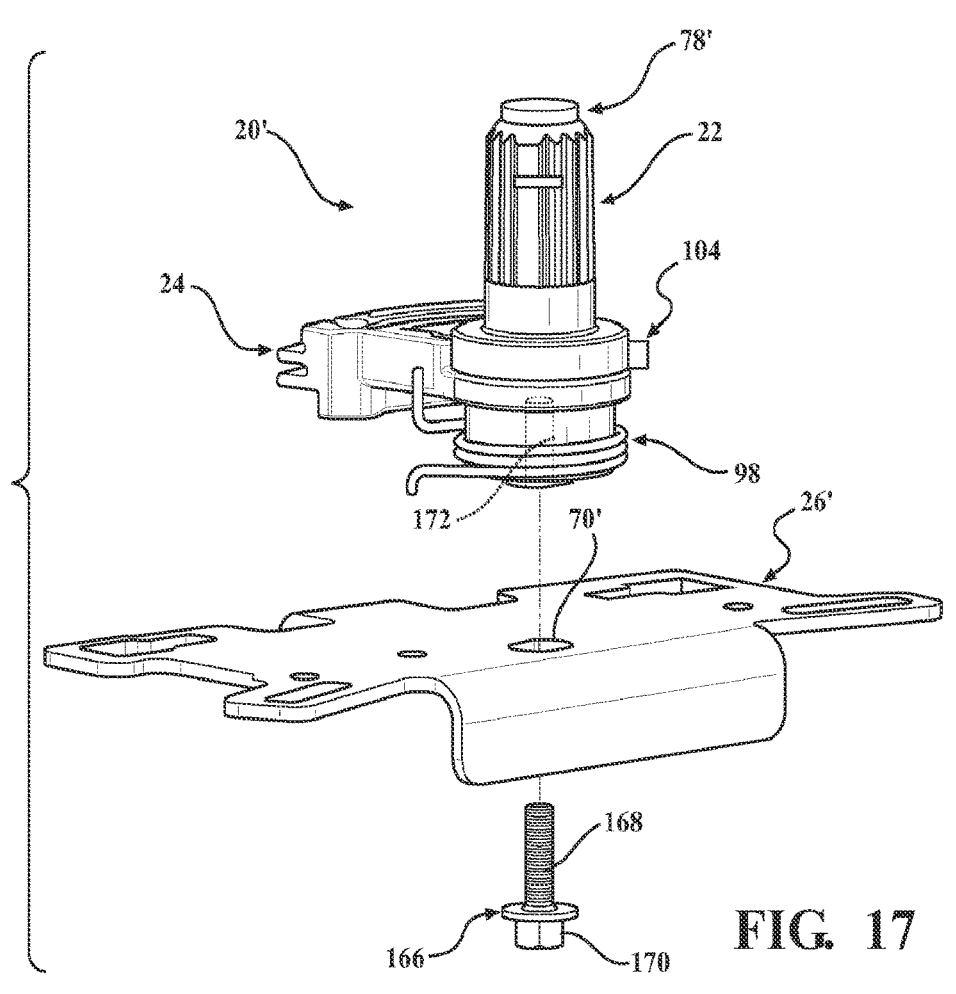
FIG. 17 is an exploded view of a remote handle assembly, according to a second embodiment of the present invention.
Figure 18:
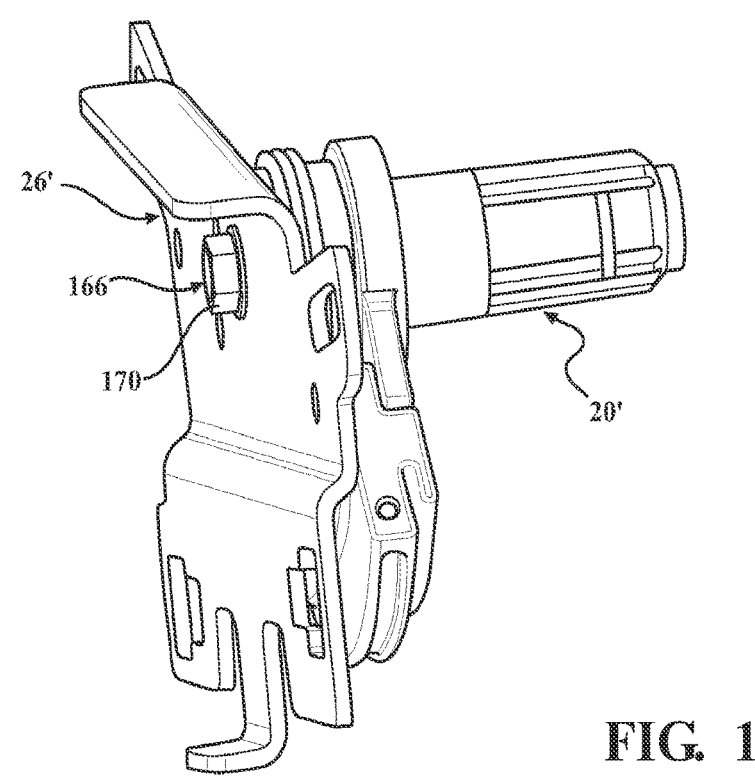
FIG. 18 is a perspective view of the remote handle assembly of FIG. 17.

A second embodiment of the remote handle assembly 20' is shown in FIGS. 17 and 18, where like primed reference numerals represent similar elements as those described above. Only significant differences between the two embodiments are reflected in the Figures and the description below: In the second embodiment of the remote handle assembly 20', the pin 78' is fixedly coupled to the handle bracket 26' by a bolt 166. A threaded shaft 168 on the bolt 166 extends from a bolt head 170 and is configured to meshingly engage with a threaded hole 172 extending axially in the proximal end of the pin 78'. The remote handle assembly 20' is shown fully assembled in FIG. 18 with the bolt head 170 abutting the rear side of the handle bracket 26'.

Figure 19:
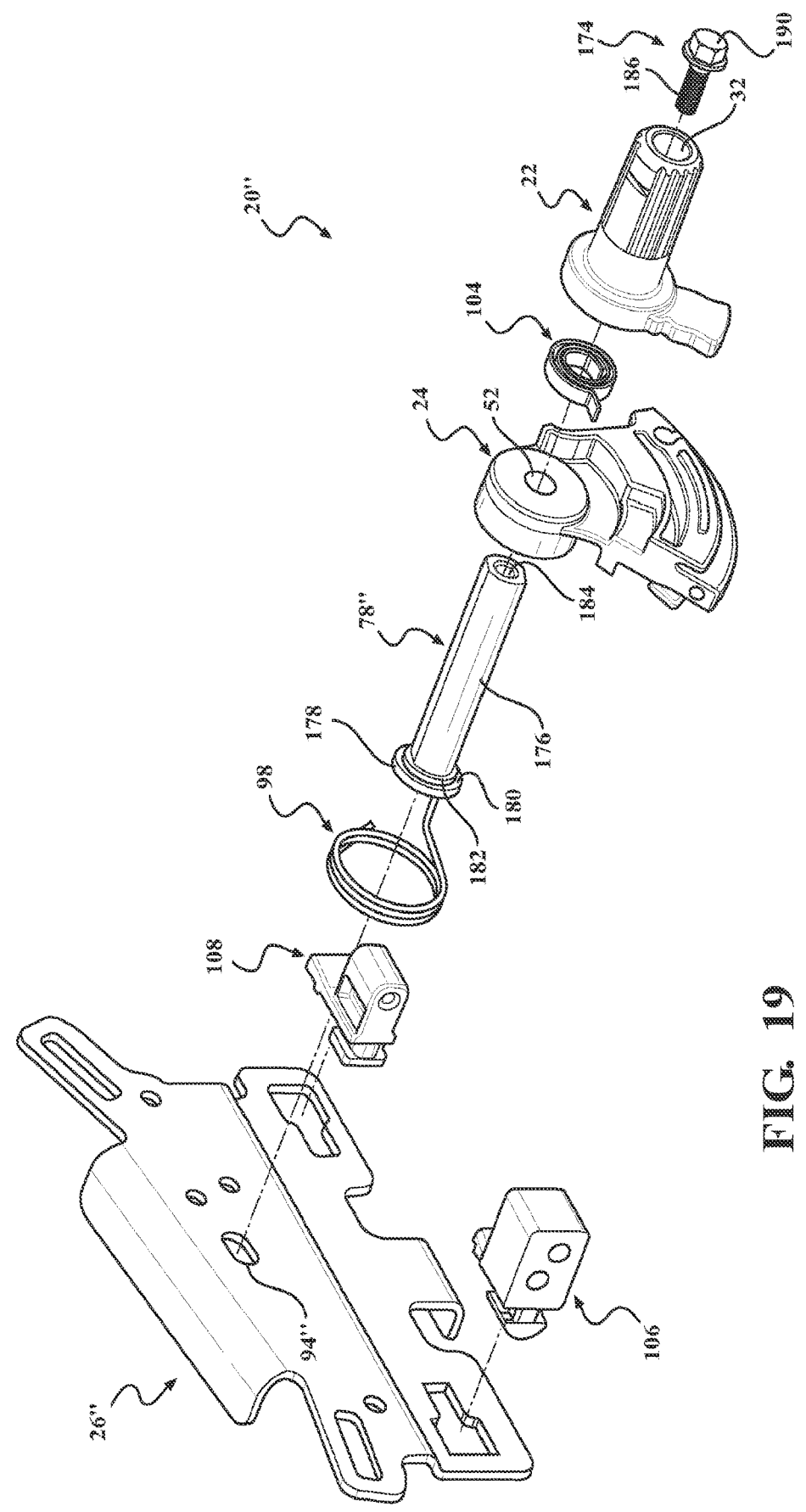
FIG. 19 is an exploded view of a remote handle assembly, according to a third embodiment of the present invention.
Figure 20:
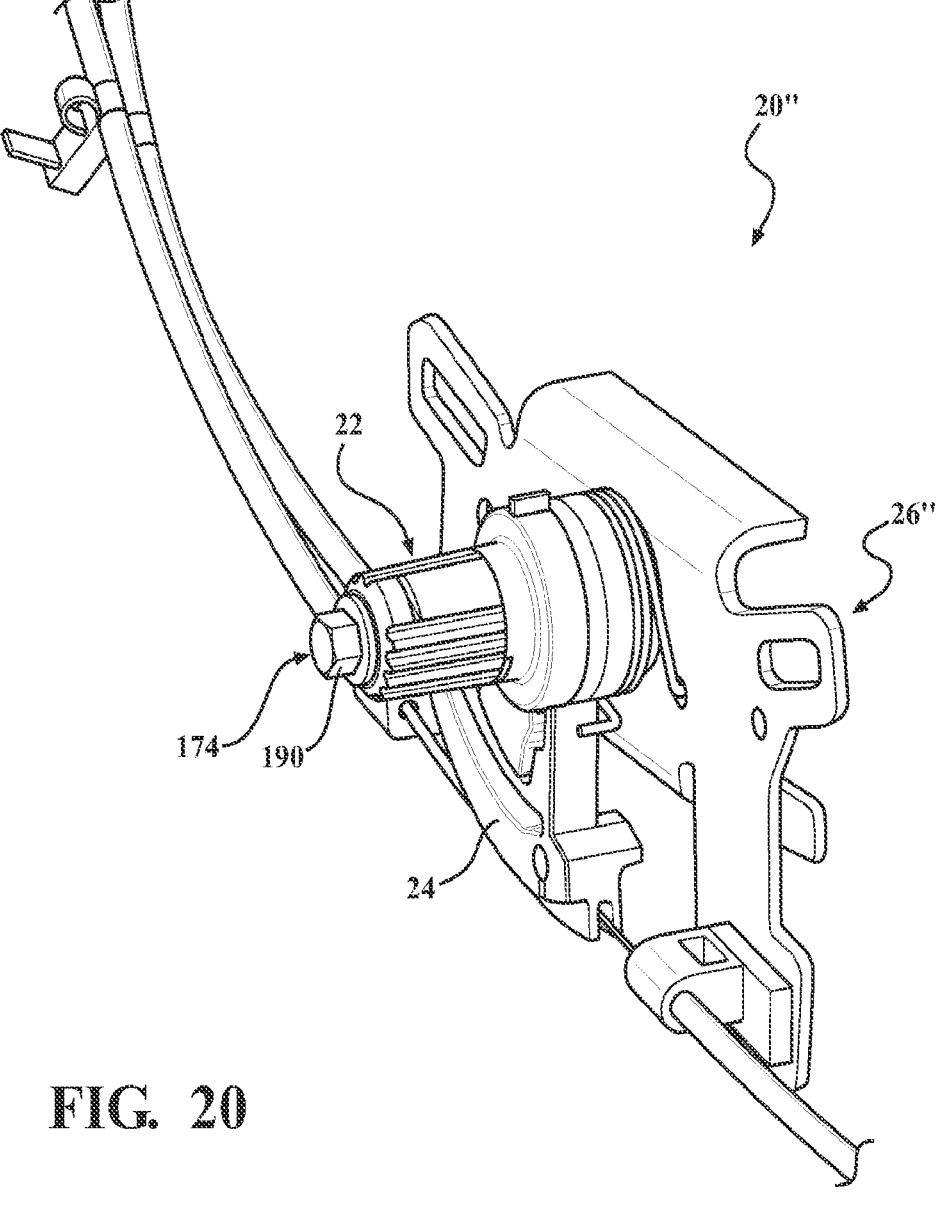
FIG. 20 is a perspective view of the remote handle assembly of FIG. 19.
Figure 21:
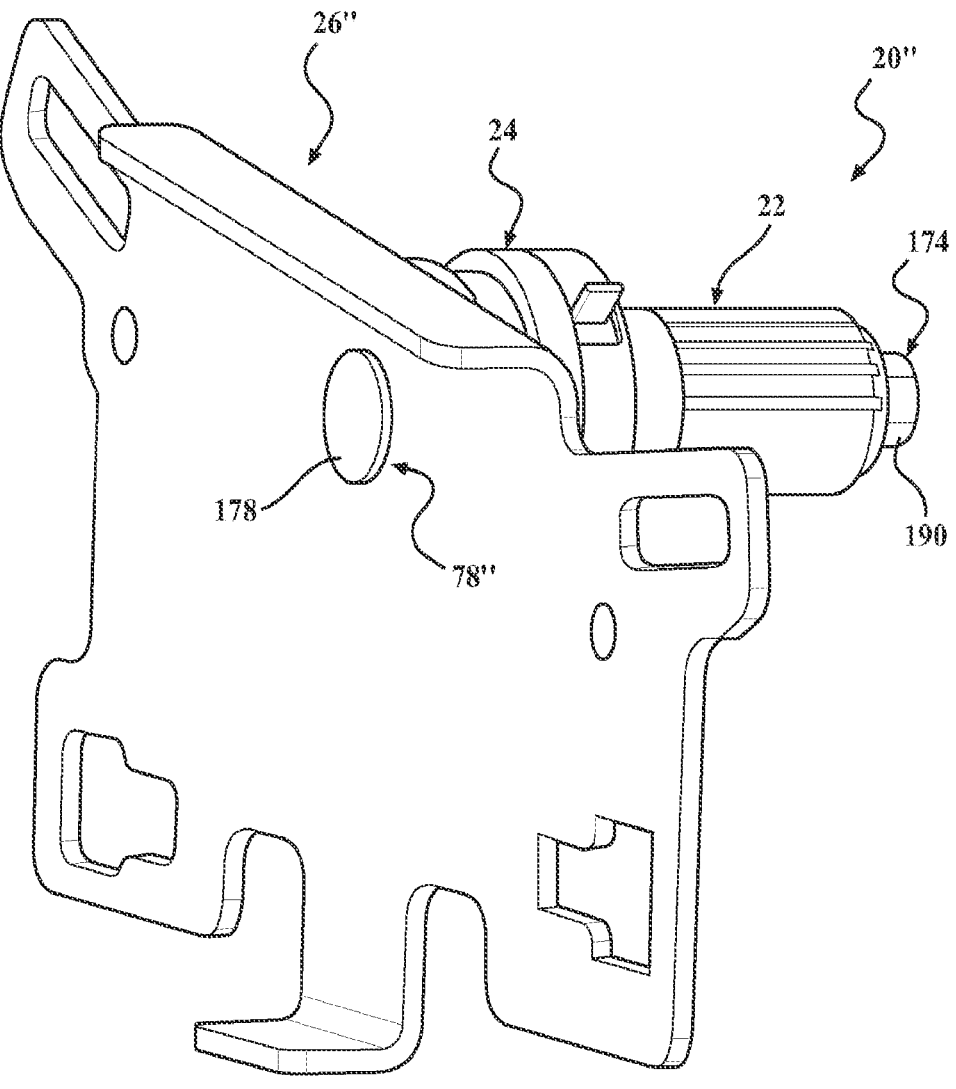
FIG. 21 is a perspective view of the remote handle assembly of FIG. 20.

A third embodiment of the remote handle assembly 20" is shown in FIGS. 19-21, where like double primed reference numerals represent similar elements as those described above. Only significant differences between the embodiments are reflected in the Figures and the description below. In the third embodiment, a pin 78" is inserted through the keyed hole 70" in the handle bracket 26" and fastened to the handle spline 22 by a bolt 174.

Referring to FIG. 19, the pin 78" has a keyed shaft 176 projecting from a stepped flange 178. The stepped flange 178 includes a first ledge 180 offset from a second ledge 182. The keyed shaft 176 has a double d-shape in cross-section. The keyed hole 70" in the handle bracket 26" is sized and shaped such that the second ledge 182 will enter the keyed hole 70". A threaded hole 184 extends axially into the distal end of the pin 78". A threaded shaft 186 on the bolt 174 extends from a bolt head 190 and is configured to matingly engage with the threaded hole 184 in the pin 78".

The remote handle assembly 20" is assembled by inserting the distal end of the pin 78" into the keyed hole 70" in the rear side of the handle bracket 26". Next, the components of the remote handle assembly 20" are mounted in reverse order onto the pin 78", and the threaded shaft 186 of the bolt 174 is inserted into the passageway 32 in the distal end of the handle spline 22 and into the threaded hole 184 in the pin 78". The fully assembled remote handle assembly 20" is shown in FIGS. 20 and 21.

As discussed above, the seat assembly 10 of the present invention includes a remote handle assembly 20, 20', 20". The remote handle assembly 20, 20', 20" includes a pin 78, 78', 78" passing axially through a handle spline 22 and fixedly coupled to a handle bracket 26, 26', 26". The stepped pin 78, 78', 78" has internal hard stops 88, 92, 96 that control the lateral looseness of the handle spline 22. In addition, the remote handle assembly 20, 20', 20" lacks a box, a cover, and fasteners fixedly coupling the cover to the box. The reduction of components in the remote handle assembly 20, 20', 20" reduces the component cost and reduces manufacturing process complexity.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A remote handle assembly for selectively unlocking a component in a seat assembly for an automotive vehicle, the remote handle assembly comprising:
a handle bracket having a hole extending laterally through the handle bracket;
a pulley having a pivot hole extending axially through the pulley;
a handle spline having a passageway extending axially through the handle spline; and
a pin extending through the passageway in the handle spline, the pivot hole in the pulley, and the hole in the handle bracket, wherein the pulley is pivotably coupled to the pin between an unactuated position and an actuated position and the handle spline is pivotably coupled to the pin between an unactuated position and an actuated position and the pin is fixedly coupled to the handle bracket and is configured to retain the handle bracket, the pulley and the handle spline together;
a primary Bowden cable operatively coupled to the pulley, wherein the pulley is rotatable from the unactuated position towards the actuated position by rotation of the handle spline from the unactuated position to the actuated position, and the pulley applies tension to the primary Bowden cable to unlock the component while the pulley is in the actuated position; and
a secondary Bowden cable operatively coupled to the pulley;
wherein the pulley is rotatable from the unactuated position towards the actuated position when tension is applied to the secondary Bowden cable, and the handle spline is decoupled from the pulley while the pulley is rotated by the secondary Bowden cable.

2. The remote handle assembly as set forth in claim 1, further comprising a spline spring operatively coupled between the handle spline and the pin to bias the handle spline in the unactuated position.

3. The remote handle assembly as set forth in claim 2, further comprising a pulley spring operatively coupled between the pulley and the handle bracket to bias the pulley in the unactuated position.

4. The remote handle assembly as set forth in claim 3, wherein:
the pin includes a stop ledge extending radially from the pin; and
the stop ledge restricts axial movement of the pulley along the pin.

5. The remote handle assembly as set forth in claim 4, wherein:
the pin includes a base ledge spaced apart from the stop ledge and extending radially from the pin; and
the base ledge of the pin frictionally engages the handle bracket.

6. The remote handle assembly as set forth in claim 5, wherein the passageway in the handle spline is butterfly-shaped in cross-section and a portion of the pin in the passageway has a double d-shape in cross section.

7. The remote handle assembly as set forth in claim 6, wherein the pin includes a head and an opposite end section, wherein the head abuts the handle spline, and the end section extends through the hole in the handle bracket and is riveted or staked, wherein the head and the riveted or staked end section are configured to retain the handle bracket, the pulley, and the handle spline together.

8. The remote handle assembly as set forth in claim 7, wherein the hole in the handle bracket and the end section of the pin are sized and shaped to fixedly couple the end section of the pin with the hole in the handle bracket.

9. The remote handle assembly as set forth in claim 6, wherein the pin includes a head and an opposite end section, wherein the remote handle assembly further comprises a bolt configured to meshingly engage with the end section on the pin and wherein the bolt and the head are configured to retain the handle bracket, the pulley, and the handle spline together.

10. A seat assembly for an automotive vehicle, comprising:
a seat cushion;
a seat back pivotably coupled to the seat cushion;
a recliner assembly configured to prevent rotation of the seat back relative to the seat cushion; and
a remote handle assembly for selectively unlocking the recliner assembly, wherein the remote handle assembly comprises:
a handle bracket having a hole extending laterally through the handle bracket, wherein the handle bracket is adapted to be mounted on the seat cushion;
a pulley having a pivot hole extending axially through the pulley;
a handle spline having a passageway extending axially through the handle spline;
a pin extending through the passageway in the handle spline, the pivot hole in the pulley, and the hole in the handle bracket, wherein the pulley is pivotably coupled to the pin between an unactuated position and an actuated position and the handle spline is pivotably coupled to the pin between an unactuated position and an actuated position and the pin is fixedly coupled to the handle bracket and is configured to retain the handle bracket, the pulley and the handle spline together;
a primary Bowden cable operatively coupled to the pulley, wherein the pulley is rotatable from the unactuated position towards the actuated position by rotation of the handle spline from the unactuated position to the actuated position, and the pulley applies tension to the primary Bowden cable to unlock the recliner assembly while the pulley is in the actuated position; and

a secondary Bowden cable operatively coupled to the pulley;
wherein the pulley is rotatable from the unactuated position towards the actuated position when tension is applied to the secondary Bowden cable, and the handle spline is decoupled from the pulley while the pulley is rotated by the secondary Bowden cable.

11. The seat assembly as set forth in claim 10, wherein the remote handle assembly further comprises a spline spring operatively coupled between the handle spline and the pin to bias the handle spline in the unactuated position.

12. The seat assembly as set forth in claim 11, wherein the remote handle assembly further comprises a pulley spring operatively coupled between the pulley and the handle bracket to bias the pulley in the unactuated position.

13. The seat assembly as set forth in claim 12, wherein:
the pin includes a stop ledge extending radially from the pin; and
the stop ledge restricts axial movement of the pulley along the pin.

14. The seat assembly as set forth in claim 13, wherein:
the pin includes a base ledge spaced apart from the stop ledge and extending radially from the pin; and
the base ledge of the pin frictionally engages the handle bracket.

15. The seat assembly as set forth in claim 14, wherein the passageway in the handle spline is butterfly-shaped in cross-section and a portion of the pin in the passageway has a double d-shape in cross section.

16. The seat assembly as set forth in claim 15, wherein the pin includes a head and an opposite end section, wherein the head abuts the handle spline, and the end section extends through the hole in the handle bracket and is riveted or staked, wherein the head and the riveted or staked end section are configured to retain the handle bracket, the pulley, and the handle spline together.

17. The seat assembly as set forth in claim 16, wherein the hole in the handle bracket and the end section of the pin are sized and shaped to fixedly couple the end section of the pin with the hole in the handle bracket.

18. The seat assembly as set forth in claim 15, wherein the pin includes a head and an opposite end section, wherein the remote handle assembly further comprises a bolt configured to meshingly engage with the end section on the pin and wherein the bolt and the head are configured to retain the handle bracket, the pulley, and the handle spline together.

* * * * *